Sept. 18, 1934.    O. A. BAILEY    1,973,698
RELIEF VALVE
Filed Sept. 22, 1933

Inventor:
Otterbein A. Bailey,
By Wynnforth, Lee, Chritton & Wiles,
Attys.

Patented Sept. 18, 1934

1,973,698

UNITED STATES PATENT OFFICE 1,973,698

RELIEF VALVE

Otterbein A. Bailey, Chicago, Ill., assignor to Chicago Bridge & Iron Company, Chicago, Ill., a corporation of Illinois Application September 22, 1933, Serial No. 690,601

5 Claims. (Cl. 277—61)

This invention relates to improvements in relief valves and, more especially, such a valve adapted for both pressure and vacuum relief control.

The invention constitutes an improvement upon the relief valve shown in United States Letters Patent No. 1,731,815 issued October 15, 1929 to C. L. Day et al. Being an improvement upon the structure shown in that patent, its construction and operation need not be described in detail. It will suffice if I point out merely the improvement over the valve of such prior patent.

In the valve of the prior patent, means are provided for obtaining relief of undue vacuum. This is described in lines 24 to 37 of page 2 of the specification of such prior patent. As stated in this description, in the case of a drop of pressure in the container, atmospheric air enters through the pipe 23 against the head of liquid 13 in the chamber 12. When the vacuum reaches a point sufficient to overcome the head of liquid in the chamber 12, atmospheric air escapes out of the lower end of the pipe and bubbles up through the liquid. It has been found that when air thus bubbles up through the liquid, more or less liquid at times is entrained in the air or carried by the air so that some of such liquid passes into the tank. In this manner there has been more or less loss or escape of liquid. The particular feature of my invention is the provision of means for permitting relief of undue vacuum and passage of atmospheric air into the tank without causing any loss or escape of the liquid in the valve.

Other features and advantages of my invention will appear more fully as I proceed with my specification.

In that form of device embodying the features of my invention shown in the accompanying drawing—

Figure 1:
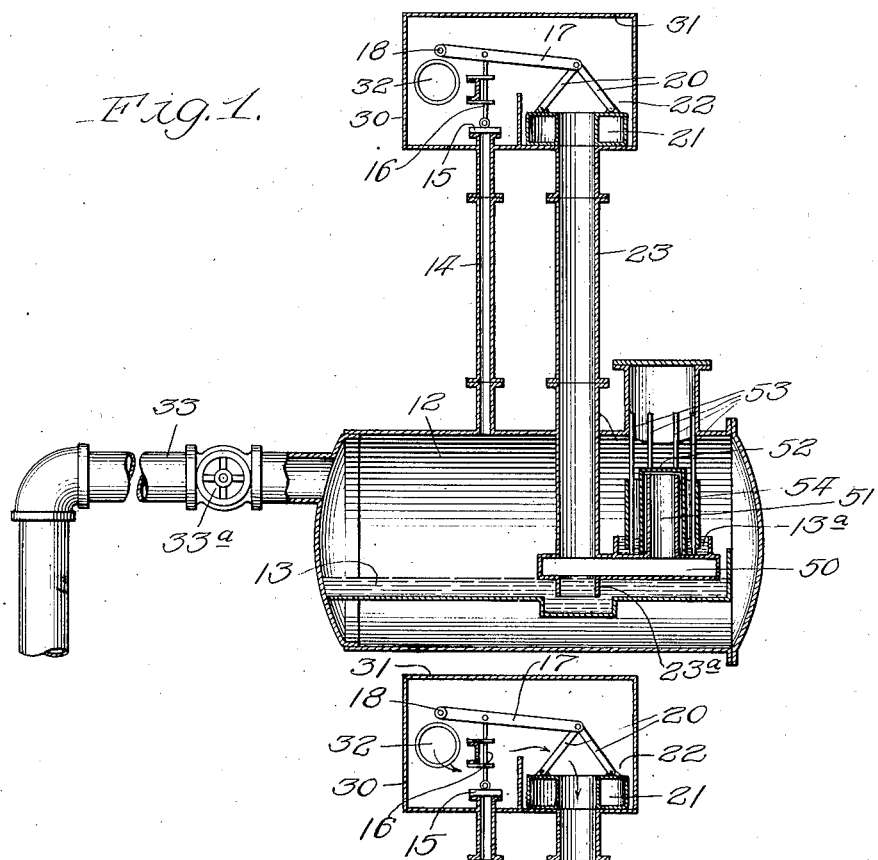
Figure 2:
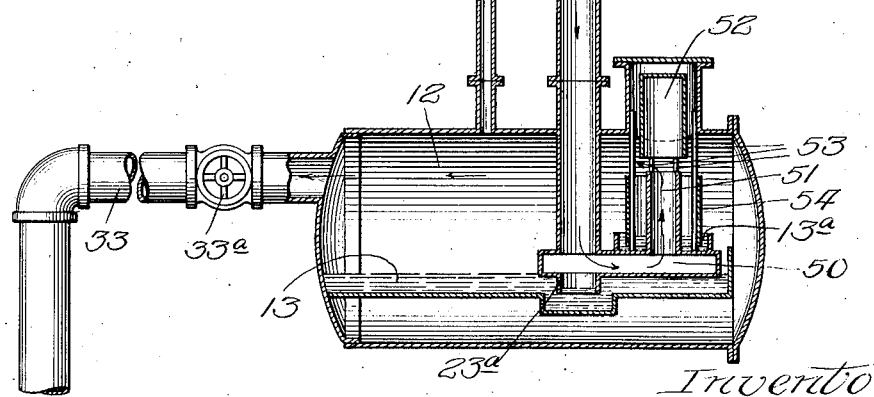

Figure 1 is a vertical sectional view of the relief valve showing the same closed, and Figure 2 is a similar view showing the inlet open.

The improved relief valve includes a chamber 12 with liquid 13 in it. 14 indicates a valve-controlled pressure outlet leading from the chamber 12 to the atmosphere. The upper end of this pressure outlet is controlled by a valve 15 carried on the lower end of a valve rod 16 pivotally mounted at its upper end on the lever 17 which has one end pivotally attached at 18. The other end of the lever 17 has pivotally attached to it by the links 20, a float 21 in the float chamber 22. 23 indicates a pipe with its lower end 23ª immersed in the liquid 13. The other end of the pipe 23 opens into the float chamber 22, the upper part of said float chamber being open to the atmosphere. The valve parts and float 21 are preferably housed in a sheet metal casing 30 having a protective cover 31. 32 indicates a suitable outlet to the atmosphere.

33 indicates a suitable pipe connection leading to the interior of the container (not shown) in connection with which the relief valve is used. This pipe may be provided with a valve 33ª to shut off the relief valve if desired.

Any suitable means (not shown) may be provided for placing the necessary liquid in the valve, and this liquid may be water, brine, or any suitable material.

The parts so far described follow very closely those shown in the relief valve of the earlier patent. In my improved valve, however, I provide a port 50 communicating with the pipe 23 near its lower end. This port 50 leads off to one side and connects with an upwardly directed pipe 51. Surrounding this pipe is a trough containing liquid 13ª. Over the pipe 51 is placed a light cap 52, for example, an aluminum can with a closed top and open bottom. The lower edge of this cap is normally sealed in the liquid 13ª.

In the operation of the device, the relief of undue vacuum is obtained in the following manner. Air enters the casing 30 through the hole 32, as indicated by the arrows, flows downwardly through the pipe 23, thence through the port 50 up through the pipe 51 lifting the cap 52. Air is then free to escape, as indicated by the arrows, into the pipe 23. The cap 52 is light enough so that it rises out of the liquid 13ª before the air pressure in the pipe 23 is sufficient to bubble out of the lower end 23ª. That is, the lower end of the pipe 23 is always liquid sealed. It will be seen, therefore, that atmosphere entering to relieve a vacuum in the tank does not pass through any of the liquid 13 and, consequently, there is no entrainment of this liquid and no loss or escape of it.

Surrounding the cap 52 I prefer to place a series of guide wires 53 and around the lower portion of these it is desirable to place a baffle 54 to direct the air escaping from the pipe 51 somewhat upwardly and thus aid in keeping the cap 52 lifted.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as permissible in view of the prior art.

What I regard as new, and desire to secure by Letters Patent, is:

1. A device of the character described including; a chamber with liquid in it; a pipe connection into the chamber above the liquid; a valve-controlled pressure outlet leading from the chamber to the atmosphere; a vacuum inlet pipe with one end immersed in the liquid in the chamber and the other end open to the atmosphere; means whereby a rise of liquid in said last-mentioned pipe opens the valve controlling the pressure outlet; and a liquid sealed vacuum inlet valve connecting said vacuum inlet pipe with said chamber.

2. A device of the character described including; a chamber with liquid in it; a pipe connection into the chamber above the liquid; a valve-controlled pressure outlet leading from the chamber to the atmosphere; a float chamber; a vacuum inlet pipe with one end immersed in the liquid in the chamber and the other end connected to the float chamber; a connection between the float and the valve controlling the pressure outlet, whereby a rise of said float causes the valve to open; and a liquid sealed vacuum inlet valve connecting said vacuum inlet pipe with said chamber.

3. A device of the character described including; a chamber with liquid in it; a pipe connection into the chamber above the liquid; a valve-controlled pressure outlet leading from the chamber to the atmosphere; a pipe with one end immersed in the liquid in the chamber; means whereby a rise of liquid in said last-mentioned pipe opens the valve controlling the pressure outlet; and a liquid sealed vacuum inlet valve connecting said last-mentioned pipe with said chamber.

4. A device of the character described including; a chamber with liquid in it; a pipe connection into the chamber above the liquid; a valve-controlled pressure outlet leading from the chamber to the atmosphere; a pipe with one end immersed in the liquid in the chamber; means whereby a rise of liquid in said pipe opens the valve controlling the pressure outlet; and a liquid sealed vacuum inlet valve between said chamber and the atmosphere, said valve permitting flow of air from the atmosphere into said chamber without passing through the liquid in said liquid seal.

5. A device of the character described including; a chamber with liquid in it; a pipe connection into the chamber above the liquid; a valve-controlled pressure outlet leading from the chamber to the atmosphere; a vacuum inlet pipe with one end immersed in the liquid in the chamber and the other end open to the atmosphere; means whereby a rise of liquid in the vacuum inlet pipe opens the valve controlling the pressure outlet; and a liquid sealed vacuum inlet valve connecting said pipe to said chamber, said valve permitting flow of air from said pipe into said chamber without passing through the liquid in said liquid seal.

OTTERBEIN A. BAILEY.